Mar. 3, 1925.
E. B. LENNIG
ELECTRIC RADIATOR
Filed Aug. 25, 1922
1,528,494
5 Sheets-Sheet 1
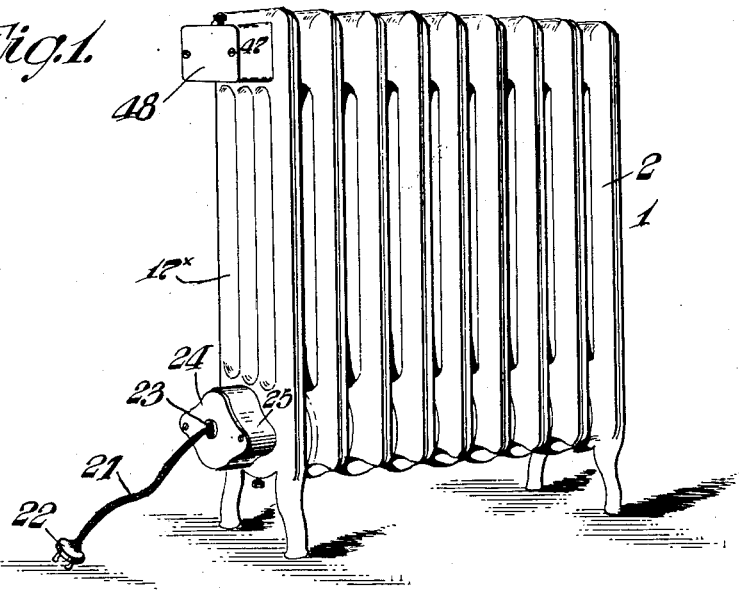
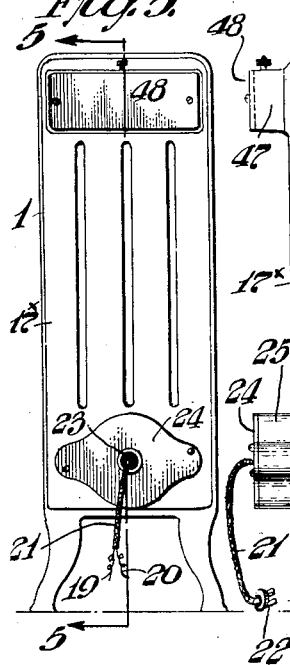
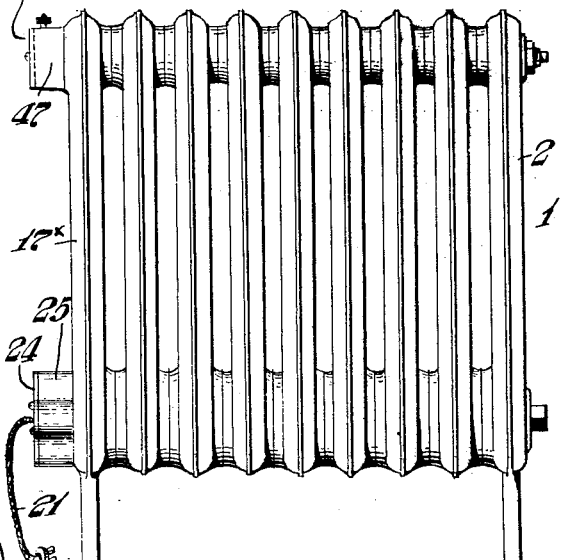
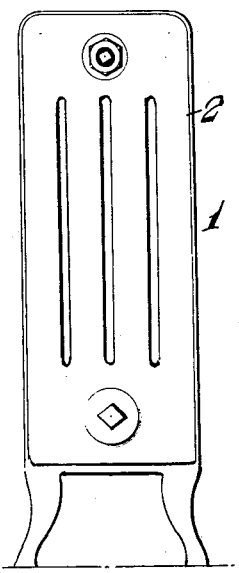
INVENTOR:
Edmund B. Lennig.
BY
ATTORNEYS.

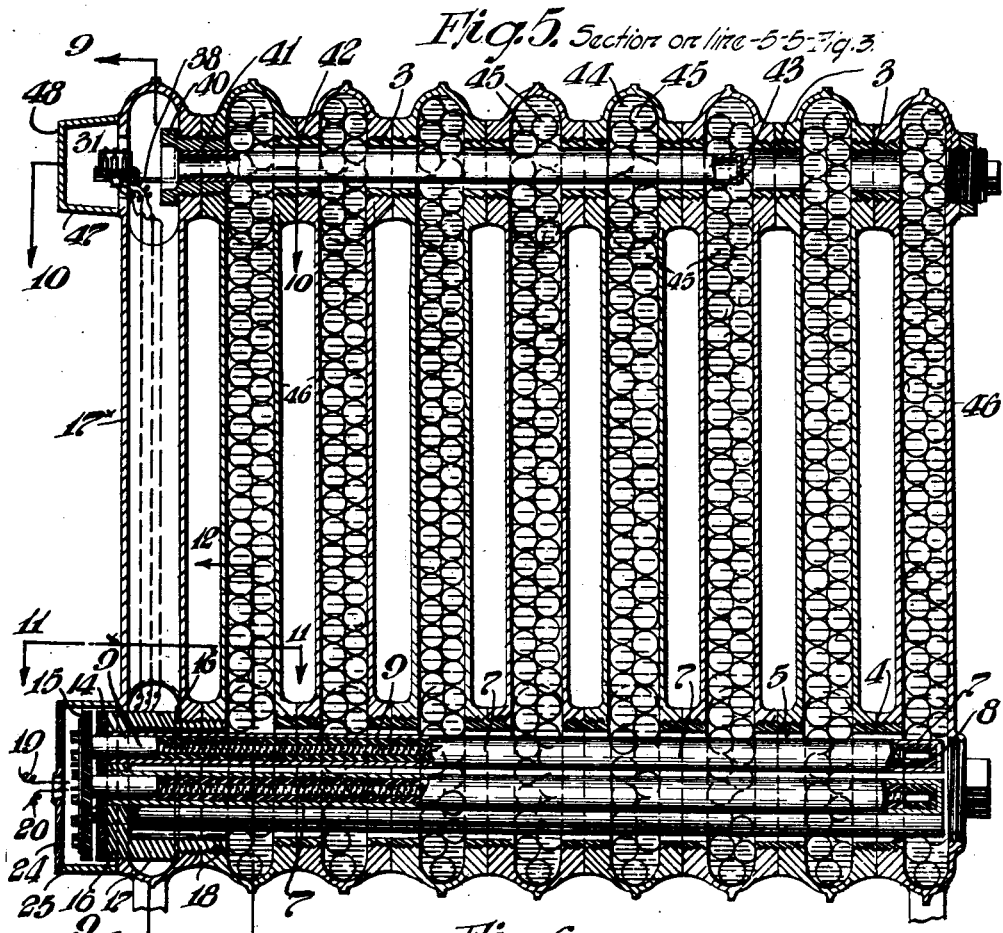

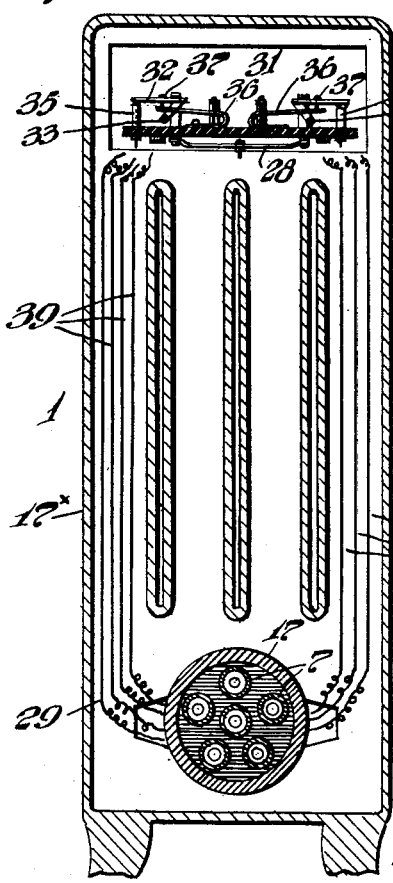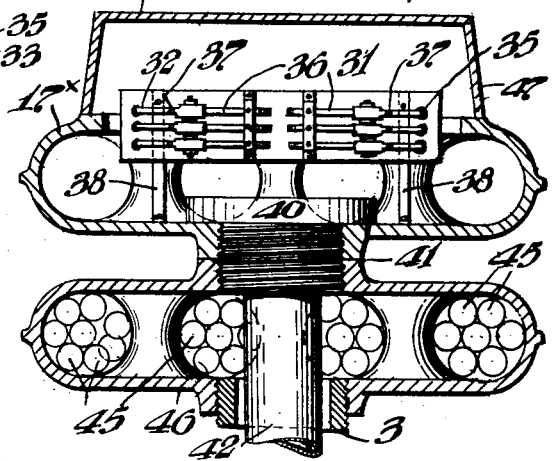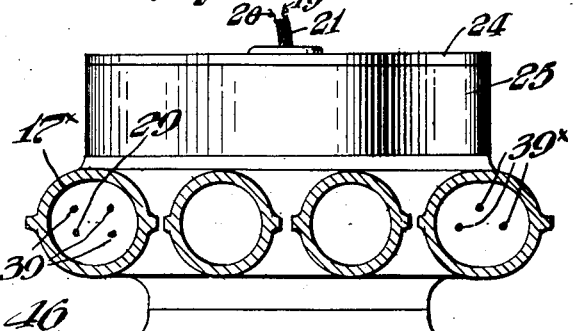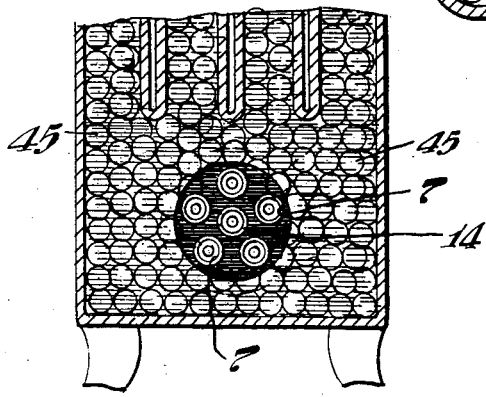

Mar. 3, 1925.
E. B. LENNIG
1,528,494
ELECTRIC RADIATOR
Filed Aug. 25, 1922
5 Sheets-Sheet 4
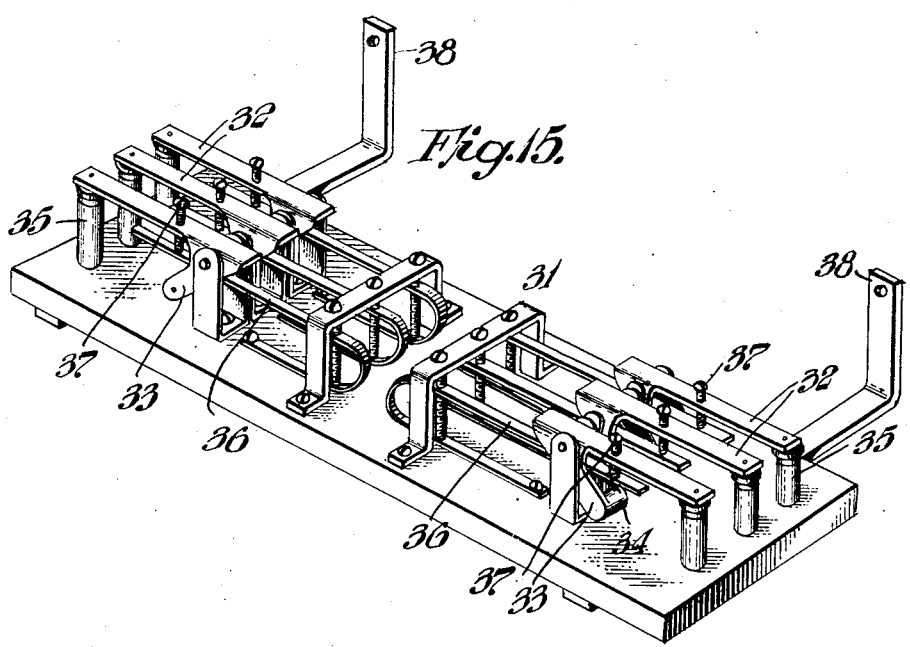
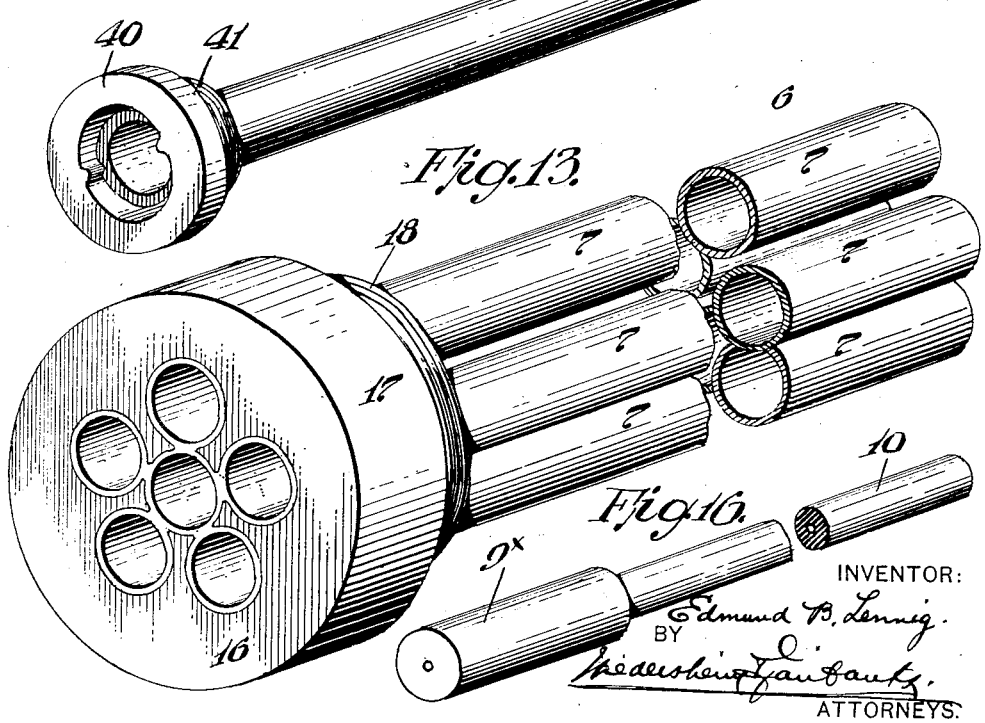
INVENTOR:
Edmund B. Lennig.
BY
ATTORNEYS.

Mar. 3, 1925.

E. B. LENNIG 1,528,494

ELECTRIC RADIATOR

Filed Aug. 25, 1922    5 Sheets-Sheet 5

INVENTOR:
Edmund B. Lennig.
BY
ATTORNEYS.

Patented Mar. 3, 1925.

1,528,494

UNITED STATES PATENT OFFICE.

EDMUND B. LENNIG, OF SAN FRANCISCO, CALIFORNIA, ASSIGNOR TO ELECTRIC RADIATOR & ENGINEERING CO., INC., OF SAN FRANCISCO, CALIFORNIA, A CORPORATION OF CALIFORNIA.

ELECTRIC RADIATOR.

Application filed August 25, 1922. Serial No. 584,176.

*To all whom it may concern:*

Be it known that I, EDMUND B. LENNIG, a citizen of the United States, residing in the city and county of San Francisco, State of California, have invented a new and useful Electric Radiator, of which the following is a specification.

My invention relates to a novel construction and arrangement of an electric radiator, wherefrom a maximum amount of heat with a minimum amount of electric current is obtained, novel means being provided automatically to store heat or to provide latent heat.

A further object of my invention is the provision of novel means to simplify the replacement of one or all of the electric coils.

A further object of my invention is the provision of novel means automatically to control an electric radiator employing thermostatic means in thermal communication with the radiator.

My invention further consists of a novel electric radiator, wherein a plurality of heating coils are submerged in the liquid contained in the radiator, means being provided for simultaneously energizing said coils to effect the heating of said liquid to a predetermined maximum temperature, and for automatically de-energizing certain of said coils as the temperature increases to a maximum, means being further provided for intermittently energizing and de-energizing the heating coils to maintain a substantially constant maximum temperature with a minimum consumption of electric energy.

My invention further consists of a novel electric radiator in which liquid hollow columns are in communication with each other and with a base chamber in which are located the heating coils for heating the liquid, novel means being provided for mounting the thermostatic device in thermal communication with the liquid in the radiator automatically to control the energizing and de-energizing of the heating coils submerged in the liquid.

My invention further consists of a novel electric radiator in which are employed heating coils in electric circuit and thermal communication with a thermostatic device, in conjunction with means in said electric circuit at any desired location for automatically controlling the operation of the electric radiator.

Another object of my invention is to devise an electric radiator in which a storage of heat or latent heat is obtained by means of clay products such as marbles or the like.

Other novel features of construction and advantage will hereinafter more clearly appear in the detailed description of my invention.

For the purpose of illustrating my invention, I have shown in the accompanying drawings certain forms thereof which are at present preferred by me, since the same will give in practice satisfactory and reliable results, although it is to be understood that the various instrumentalities of which my invention consists may be variously arranged and organized and that my invention is not limited to the precise arrangement and organization of these instrumentalities as herein shown and described.

Figure 1 represents a perspective view of an electric radiator embodying my invention.

Figure 2 represents a front elevation of Figure 1.

Figure 3 represents an end elevation of the left-hand end of the radiator seen in Figure 2.

Figure 4 represents an end elevation of the right-hand end of the radiator seen in Figure 2.

Figure 5 represents a vertical section on the line 5—5 Figure 3.

Figure 6 represents on an enlarged scale a longitudinal sectional view, partly in elevation, of one of the heating elements.

Figure 7 represents a section on line 7—7 Figure 6.

Figure 8 represents an end view of Figure 6.

Figure 9 represents a section on line 9—9 Figure 5.

Figure 10 represents a section on line 10—10 Figure 5.

Figure 11 represents a section on line 11—11 Figure 5, certain of the parts being shown in elevation.

Figure 12 represents a section on line 12—12 Figure 5.

Figure 13 represents in detached position a perspective view of the head and tubes containing the electric heating elements, Figure 14 represents a perspective view of the upper air tube in detached position.

Figure 15 represents a perspective view of the thermostat in detached position.

Figure 16 represents a perspective view of an insulating core removed from the unit seen in Fig. 13.

Similar numerals of reference indicate corresponding parts. Referring to the drawings:—

Figure 17:
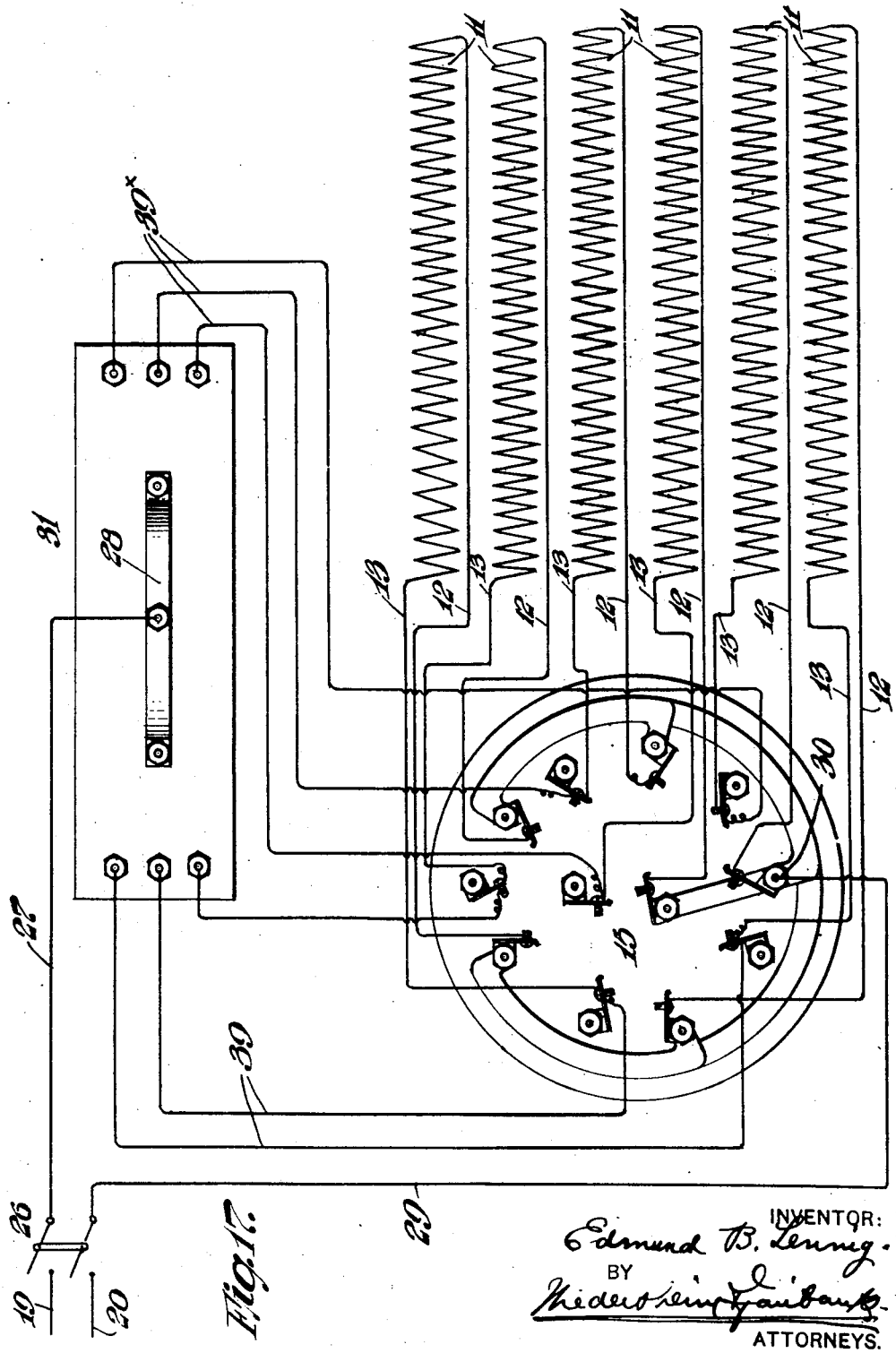
Figure 17 represents a wiring diagram showing the connections from the heating coils to the thermostat.

1 designates my novel construction of electric radiator, the same comprising the radiator sections 2, which are of substantially the same construction and are held in assembled position by the upper threaded nipples 3, and the lower enlarged threaded nipples 4, whereby an enlarged transverse lower chamber 5 is formed for the reception of the unit comprising the heating coil holders 6 and their adjuncts, which are shown as six in number, although it will be evident that the number of these may be increased or diminished, according to requirements.

Each of said holders comprises an outer tubular casing or brass tubing 7, closed at one end, as indicated at 8, and open at the other end. Within each tubing or casing 7 is inserted the hollow or tubular insulating casing 9, within which is contained the core or insulation 10, about which latter is wound the heating coil 11, the latter being contained between the insulating elements 9 and 10 and its outer terminals 12 and 13 projecting as shown in Fig. 6, so as to enable the desired electrical connections to be made. As the construction and manner of assembling each of the heating coils with respect to their insulating core and casing is the same, a description of one will suffice for all. The core 10 is provided with the head 9×, see Figures 6 and 16 and, as will be seen from the left of Figure 5, the head 9× projects a short distance beyond the tubing 7 and passes through a hole in an insulating disc or plate 14, in proximity to which is an outer insulating plate or disc 15 upon which the various electrical connections and binding posts are supported so as to be readily accessible, as will be understood from Figures 5 and 17.

The left hand ends of the plurality of outer casings or tubings 7, which constitute the enclosures for the heating elements are secured or brazed in the outer wall 16 of the head 17, which is mounted in the outer lower portion of the left hand radiator section 17×, as will be understood from Figure 5, the inner or right hand portion of said head being of reduced diameter and threaded, as indicated at 18, so as to engage the lower contiguous portions of the outer left-hand sections so as to couple them together and form a seal to prevent liquid entering the left-hand radiator section 17×, seen in Figure 5, a tight joint being effected by means of the gasket 16×.

I have shown the tubes 7 containing the heating coils and their adjuncts as being preferably six in number and by assembling them in the detachable head 17, the tubes and head and the heating coils within said tubes can be withdrawn and replaced as a unit, as will be understood from Figure 13, so that any tube and its heating coil is readily and instantly accessible for the purposes of inspection, replacement or repair, as will be understood from Figure 13. The threaded portion 18 serves to couple the two right-hand end sections together and the shoulder and gasket 16× seen at the lower left hand portion of Figure 5 form an effective seal to prevent leakage into the left-hand radiator section 17×, which contains the thermostat and the wires leading thereto, to be referred to. The current is conducted into the radiator through the wires 19 and 20, which are insulated as shown at 21 in Figure 1 and connected to a suitable socket as 22, said wires passing through the hole 23 of the outer cap 24 secured to the outer casing 25, so that upon the removal of said cap immediate access is had to all the wiring connections.

A suitable switch 26 may be provided as indicated at 26 in Figure 17 from which one wire 27 leads to the member 28 of a thermostat 31 while the other wire 29 leads to a binding post as 30 from which a wire corresponding to the wire 12 leads to one of the heating coils 11.

The thermostatic member 31 is located at the upper left hand portion of the radiator section 17× as seen in Figures 5, 9 and 10, and as the same is preferably constructed in conformity to the thermostat seen in my prior Patent No. 1,391,239, granted September 20, 1921, the construction and operation of the same need not be described in great detail, as the manner of making the wiring connections will be readily apparent from my patent aforesaid and from Figure 17, wherein I have shown the collocation of the six heating coils and the wiring connections therefrom to the outer insulating disc 15 and to the bottom member 28 of the thermostat 31, which is shown in detail in Figure 15.

The general construction of the thermostat 31 best seen in Figure 15 is the same as that seen in my prior patent aforesaid, except that in lieu of arranging the thermostat blades six in a row, I have, for the sake of making the device compact for the purposes intended, arranged the thermostatic contact members 32 in two sets of three each, juxtaposed to and in alignment with each other, the contact arms 32 being formed integral with or secured to the depending arms 33 which carry the counterbalance weights 34 which are located past the center of gravity of the pivot of said contact arms to hold the latter normally in contact with the contact posts in electrical connection with the electrical devices which control the thermostat.

36 designates the thermostat plates or springs which contact with the adjusting screws 37 carried by the arms 32. The thermostat 31 is supported in the upper left radiator section 17× by means of arms or brackets 38, and the connection of the wires 39 and 39× which afford electrical communication from the two groups of six heating coils 11 to the thermostat 31 will be apparent to those skilled in the art from the wiring diagram seen in Figure 17, the mode of operation of the thermostat being apparent from the wiring diagram seen in Figure 7 of my Patent No. 1,391,329 and requiring no further detailed description.

40 designates a head having the threaded extension 41 which forms a coupling connection for the upper left hand portions of the two left hand radiator sections, as will be understood from Figure 5, said head having the tubing 42 secured therein, the opposite end of said tubing being closed as indicated at 43, said tubing serving as an air tube and said upper head 40, together with the lower head 17, serving as a closure to keep liquid out of the left hand radiator section 17×, which is thus isolated from the other radiator sections, as will be understood from Figure 5. The air tube 42 is of less diameter than the nipples 3 as will be understood from Figure 5, so that the circulation of the liquid through the upper portion of the radiator is not impeded.

The outer or left hand of the air tube as seen in Figure 14 is constructed as seen in Figure 14, so that by the application of a suitable wrench the tube can be screwed into place.

The radiator sections, with the exception of the left hand section 17× seen in Figure 5, are filled with a suitable heating medium, such as oil, as indicated at 44, and each radiator section is also filled with clay spheres or marbles, as indicated at 45, contained within the radiator columns 46.

In equipping my novel radiator for the market, the parts are first assembled substantially as seen in Figure 5, with the oil or liquid heating element 44 supplied thereto and clay marbles 45. Before sealing up the openings, the electrical energy is turned into the coils and the liquid allowed to heat to a greater temperature with all of the coils in active use than under actual working conditions. As the heat increases in the radiator, the liquid expands and the excess of the liquid and air is allowed to drain or escape from the radiator. When the excess temperature, say 250 degrees Fahr. has been reached in testing the radiator, it is then sealed and allowed to cool. The liquid, in cooling, shrinks to its normal density, thus creating an empty space or vacuum in the radiator.

Thus, when the radiator is not in operation, it is under vacuum and when the radiator is in actual working use, the liquid does not create a pressure. The function of the vacuum is to enable the oil or other heating liquid element employed to circulate more freely and it will heat, as is known, more readily under vacuum than under pressure, whereby I am enabled to effect a considerable saving of electrical energy.

It will be apparent that by the employment of the clay products or marbles, 45, these marbles, being round, do not entirely fill the hollow columns in the radiator sections, but leave enough space for the liquid and in heating the liquid, ample space is assured for the circulation.

The function of these clay marbles is, first, to reduce the quantity of oil that it would take to fill the hollow radiator columns, there being present a smaller quantity of liquid to heat, consequently it takes less electrical energy to bring the temperature of the heating element to the predetermined heat, thereby effecting a saving in the cost of operation; second, it takes less electrical energy to kep a small amount of liquid at a predetermined temperature than it does a larger quantity, thus effecting a saving in the cost of operation; third, the clay products or marbles create a latent or storage heat, whereby I obtain without any additional expense, a saving of electrical energy and also acquire an additional amount of heat without any additional cost, when the electrical energy is turned off.

When the electrical energy is turned into the coils, the liquid heats to the pre-determined temperature and the marbles also absorb heat to the same temperature of the liquid, then when the electrical energy is turned off, if it were not for the marbles, this body of liquid would cool quickly.

The action on the temperature of the space heated is as follows:—

The circulation of air around the radiator draws off the heat from the cast iron radiator and in doing this naturally cools the temperature of the liquid and due to the fact that we have present an inner column of marbles or clay products, this liquid is supplied with additional heat, which under ordinary conditions does not occur.

I have found by actual tests, that when the radiator is filled with oil only, it takes nearly one hour to heat up and 25 minutes to cool down to the temperature of the space heated. When the marbles are also placed in the hollow columns of the radiator, it only takes 25 minutes to bring the radiator to the same temperature and one hour to cool down to the temperature of the room.

Special attention is called to the fact that by the provision of the enlarged bottom chamber 5, I am enabled to employ larger tubes 7 to hold the cores 10 and their heating coils, thus increasing the heating surface of the coil holders which come in contact with the liquid, because it is well known that the larger the heating surface that comes in contact with any volume of liquid, a greater economy is attained in the heating of said volume of liquid.

From my novel construction of coil holder, it will be evident that any one or more of the coils 11 can be replaced without a total loss of the entire heating unit or element and one or more of the coils can be readily detached for inspection, replacement or repair, which is a very important feature affecting the practical cost of maintenance.

It will be understood from the foregoing that by my present invention, I have devised an electric radiator adapted to contain a suitable liquid which is subjected to the action of a heating unit comprising a plurality of heating coils and that by using a clay product in conjunction with liquid used, a storage of heat or latent heat is obtained.

These coils are so arranged as to be energized and de-energized step by step by individual thermostats controlled by the temperature of the liquid and adjusted to be cut out at different degrees of temperature, so that the radiator can be accurately and automatically controlled within predetermined ranges of temperature and will be automatically controlled in such a manner that any predetermined temperature can be maintained with a minimum consumption of electric current.

The upper portion of the left-hand radiator section 17˟ is provided with a suitable detachable case 47 provided with a front cover 48, so that on the removal of said case the thermostat 31 and air tube 42 are readily accessible.

Upon the removal of the bottom plate 24, the head 17 and tubes 7, comprising the heating unit 6 are readily accessible, as is evident, so that all the parts of my novel radiator are convenient of access at all times.

It will be further understood from the foregoing that I have devised an electrical radiator adapted to contain a suitable liquid, which is subjected to the action of a heating unit comprising a plurality of heating coils, which are arranged to be energized and de-energized step by step by individual thermostats controlled by the temperature of the liquid and adjusted to be cut out at different degrees of temperature so that the radiator can be accurately and automatically controlled within predetermined ranges of temperature and will be automatically controlled in such a manner that any predetermined temperature can be maintained with a minimum consumption of electrical current.

The field of usefulness of this heating system is very large and it can be installed wherever an electric service line is available. In a house containing small apartments, one in each apartment will be sufficient. This system renders it unnecessary to employ heaters in the basement and to employ piping in the basement and through the walls and under the floors of the building. There is nothing to freeze up or leak. It is absolutely noiseless in action. Flues or vents are not needed. The expenses incident to employing a janitor or engineer and the consumption of fuel, wood, oil or gas are dispensed with, as well as the attendant dirt and dust from such operation. It is available for immediate use at any time of the year and at any time of the day or night. It is optional with every occupant of the house in every separate room to have heat or be without it as he desires. Each tenant pays for what he gets and no more. The owner is relieved from any annoyance or expense. These are a few of the advantages in an apartment house, and these advantages apply also to any habitation of man.

It can be installed in a tent, a camp, a bunkhouse in the woods, on a ship, in the basement or attic, in the depths of a mine or tunnel, in a palace or a hovel, in a bungalow, a cottage, a farmhouse, a summer camp in the mountains, a garage, a barn, a store or office, and other places too numerous to mention in detail. The radiator is portable and can be plugged in any light socket and it can be manually transported and used by the owner wherever the occasion requires.

The cost of operation is about twenty five watts per hour to each square foot of radiation, and in this climate the cost to heat an ordinary sized room or small apartment would be about one cent per hour when the k. w. h. rate does not exceed one cent.

To state the matter in another way, when the service rate is two cents per k. w. h. it will cost approximately about one twentieth of a cent per hour for a foot of radiation to maintain a temperature of 180°. If the climate is severe, it takes more feet of radiation for the radiator, and the milder the climate, the smaller will be the amount of radiating surface to warm a given space.

While I have referred to the liquid heating element as being preferably oil and to the spherical heating elements as being clay marbles, it will be apparent that other equivalent liquid and solid heating elements may be employed without departing from the spirit of my invention.

It will now be apparent that I have devised a novel and useful electric radiator which embodies the features of advantage enumerated as desirable in the statement of the invention and the above description, and while I have in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention, what I claim as new and desire to secure by Letters Patent, is:—

1. The combination in an electric radiator of a hollow body adapted to receive a liquid heating element, an electric heater in said body having heating coils, and a thermostat for each coil and in electrical communication with it automatically to successively control the energizing and de-energizing thereof, said thermostats being carried by said body in position to be subject to and controlled by variation in temperature of said liquid heating element.

2. The combination in an electric radiator, of a hollow body adapted to receive a liquid heating element, an electric heater in said body having heating coils, a chamber carried by said body in proximity to said liquid element, and a thermostat for each coil and in electrical communication with it automatically to successively control the energizing and de-energizing thereof; said thermostats being disposed in a chamber and out of communication with said liquid.

3. The combination in an electric radiator, of hollow sections adapted to receive a liquid, an electric heater in the lower portion of said sections having heating coils, a chamber in one of said sections in proximity to said liquid, a thermostat in said chamber for each coil and in electrical communication with it through wires in an exterior conduit automatically to successively control the energizing and de-energizing thereof, and upper and lower heads forming coupling devices for two end sections, said heads serving to isolate said thermostat chamber from said liquid.

4. An electric radiator, comprising a hollow base and columns rising therefrom, said base and columns being adapted to receive a liquid, an electric heater in said base comprising a plurality of inclosed heating coils and a thermostat for each coil and in electrical communication automatically to successively control the energizing and de-energizing thereof, said thermostat being controlled by the variation in temperature of the liquid in one of said columns.

5. An electric radiator, comprising a liquid containing body portion, heating coils within said body portion, an enclosing casing for said coils, and individual thermostats in electrical communication with said coils to successfully control the energizing and de-energizing of each of said coils, and means to cause said thermostats to de-energize different coils at different degrees of temperature of said liquid.

6. An electric radiator, comprising a liquid containing body portion having an aperture therein, a casing having one end open and the other closed, and extending through said aperture into the liquid, an insulating plate closing the open end of said casing, means to seal said casing with respect to said body portion, heating coils within said casing, and thermostats controlled by the temperature of the liquid and independently and successively controlling the heating coils to close or open the circuit thereof.

7. An electric radiator comprising a liquid containing body portion having an aperture thereinto, a casing having one end open and the other closed, and extending through said aperture into the liquid, an insulating plate closing the open end of said casing, means to seal said casing with respect to said body portion, heating coils within said casing, and thermostats controlled by the temperature of the liquid and independently and successively controlling the heating coils to close or open the circuit thereof.

8. An electric radiator comprising a hollow base, hollow communicating radiator columns supported on said base, a heater supported in said base and comprising a plurality of heating coils insulated from each other, a chamber at the upper portion of said radiator columns and in thermal communication with the liquid in a radiator column, and thermostatic means in said chamber and in electrical communication with said coils, said thermostatic means including a plurality of switches and a plurality of thermostat blades.

9. An electric radiator comprising a hollow base, hollow communicating radiator columns supported on said base, a heater consisting of a plurality of heating coils insulated from each other and located in said base, means for sealing said heating coils, a chamber located at the upper portion of said radiator columns and in thermal communication with the liquid in the radiator columns, thermostatic means in said chamber, consisting of a main electric circuit including independent circuits, a plurality of switches, and a plurality of thermostat blades, and means for varying the thermal adjustment of said switches with respect to said thermostat blades.

10. The combination in an electric radiator of a hollow body adapted to receive a liquid heating element, an electric heater in said body having heating coils, and a thermostat for each coil and in electrical communication with it automatically to control the energizing and de-energizing thereof; said thermostats being carried by said body in position to be subject to and controlled by variation in temperature of said liquid heating element, in combination with refractory spheres positioned in said body to absorb and retain heat from said liquid element.

11. The combination in an electric radiator, of a hollow body adapted to receive a liquid heating element, an electric heater in said body having heating coils, a chamber carried by said body in proximity to said liquid element and a thermostat for each coil and in electrical communication with it automatically to control the energizing and de-energizing thereof; said thermostats being disposed in a chamber and out of communication with said liquid, in combination with refractory bodies located in said hollow body.

12. The combination in an electric radiator, of hollow sections adapted to receive a liquid, an electric heater in the lower portion of said sections having heating coils, a chamber in one of said sections in proximity to said liquid, a thermostat in said chamber for each coil and in electrical communication with it through wires in an exterior conduit automatically to control the energizing and de-energizing thereof, and upper and lower heads forming coupling devices for two end sections, said heads serving to isolate said thermostat chamber from said liquid, in combination with refractory bodies located in said liquid.

13. An electric radiator, comprising a hollow base and columns rising therefrom, said base and columns being adapted to receive a liquid, an electric heater in said base comprising a plurality of inclosed heating coils, and a thermostat for each coil and in electrical communication with it automatically to control the energizing and de-energizing thereof, said thermostat being controlled by the variation in temperature of the liquid in one of said columns, in combination with refractory spheres located in said base and columns.

14. An electric radiator, comprising a liquid containing body portion, heating coils within said body portion, an enclosing casing for said coils, and individual thermostats in electrical communication with said coils to control the energizing and de-energizing of each of said coils, and means to cause said thermostats to de-energize different coils at different degrees of temperature of said liquid, in combination with refractory bodies located in said body portion.

15. An electric radiator, comprising a liquid containing body portion having an aperture thereinto, a casing having one end open and the other closed, and extending through said aperture into the liquid, an insulating plate closing the open end of said casing, means to seal said casing with respect to said body portion, heating coils within said casing, clay marbles contained in said liquid, and a thermostat controlled by the temperature of the liquid and independently controlling each heating coil to close or open the circuit thereof.

16. An electric radiator, comprising a liquid containing body portion having an aperture thereinto, a casing having one end open and the other closed, and extending through said aperture into the liquid, an insulating plate closing the open end of said casing, means to seal said casing with respect to said body portion, heating coils within said casing, and a thermostat controlled by the temperature of the liquid and independently controlling each heating coil to close or open the circuit thereof, in combination with refractory bodies located in said body portion and surrounded by said liquid.

17. An electric radiator, comprising a hollow base having upwardly projecting hollow columns supported above said base, a heater casing within said base, means to effect a seal between said casing and base, heating coils within said casing, and thermostatic means operatively connected with said coils and responsive to variations in temperature of the liquid to control said heating coils, in combination with refractory bodies located in said hollow base and columns.

18. An electric radiator, comprising a hollow body, hollow communicating radiator columns supported on said body, said body member having a liquid chamber in communication with said radiator columns, heating coils submerged in the liquid in said chamber, and a thermostatic device in thermal communication with said liquid and in electrical connection with said heating coils automatically to control them, in combination with refractory bodies located in said hollow base and hollow columns.

19. An electric radiator comprising a hollow base, hollow communicating radiator columns supported on said base, a heater supported in said base and comprising a plurality of heating coils insulated from each other, a chamber at the upper portion of said radiator columns and in thermal communication with the liquid in a radiator column, and thermostatic means in said chamber and in electrical communication with said coils, said thermostatic means including a plurality of switches, and a plurality of thermostat blades, in combination with refractory bodies located in said hollow base and columns.

20. An electric radiator comprising a hollow base, hollow communicating radiator columns supported on said base, a heater consisting of a plurality of heating coils insulated from each other and located in said base, means for sealing said heating coils, a chamber located at the upper portion of said radiator columns and in thermal communication with the liquid in the radiator columns, thermostatic means in said casing, consisting of a main electric circuit including independent circuits, a plurality of switches, and a plurality of thermostat blades, and means for varying the thermal adjustment of said switches with respect to said thermostat blades, in combination with refractory bodies located in said hollow base and columns.

21. An electric radiator comprising a plurality of sections, all of the latter except an end section being filled with a liquid heating element, means for isolating said end section from the other sections, and means for electrically heating said element, in combination with a thermostat located in said isolated end section and electrical connections also contained in said isolated section from the electric heating means to said thermostat.

22. An electric radiator comprising a plurality of sections, all of the latter except an end section being filled with a liquid heating element and clay marbles, means for isolating said end section from the other sections, and means for electrically heating said liquid element and marbles, in combination with a thermostat located in said isolated end section, and electrical connections also contained in said isolated section from the electric heating means to said thermostat.

23. An electric radiator comprising a plurality of sections all excepting an outer section being adapted to receive a liquid heating element, an air tube arranged in said sections closed at one end and open at the other and provided with a threaded head adapted to couple the upper portion of two outer sections together, a heating unit containing electric heating coils and having a threaded head coupling the lower portion of said two outer sections together, and a liquid heating element contained in said sections except the outer section, the latter being isolated from the other sections, in combination with thermostats contained in said isolated section, and connections from said electric heating coils to said thermostats automatically to control the energizing and de-energizing of each coil, said thermostats being subject to and controlled by variations in temperature of said liquid heating element.

24. An electric radiator comprising a plurality of sections all excepting an outer section being adapted to receive a liquid heating element, an air tube arranged in said sections closed at one end and open at the other and provided with a threaded head adapted to couple the upper portion of two outer sections together, a heating unit containing electric heating coils and having a threaded head coupling the lower portion of said two outer sections together, and a liquid heating element contained in said sections except the outer section, the latter being isolated from the other sections, in combination with clay marbles contained in said liquid element and adapted to store latent heat, thermostats contained in said isolated section and connections from said electric heating coils to said thermostats automatically to control the energizing and de-energizing of said coils, said thermostats being subject to and controlled by variations in temperature of said liquid heating element.

25. In an electric radiator, a plurality of hollow sections adapted to receive a liquid heating element, coupling devices for the upper and lower portions of said sections, the lower coupling devices being of greater area than the upper coupling devices, whereby an enlarged chamber is formed at the bottom of said sections, an electric heating unit located in said chamber at the bottom of said sections and comprising a head having a plurality of tubes open at their outer ends and closed at their inner ends, insulating linings for each of said tubes, an insulating core contained in each of said linings, a heating coil wound around each of said cores and contained between said linings and cores, an insulating disk placed against the outer surface of said head and having the outer ends of said cores passing therethrough, an outer insulating disk through which the terminals of said coils pass, binding posts on said outer disks, means for isolating the outer radiator section from the other sections, thermostats contained in said outer isolated section, connections from each of said heating coils and binding posts to said thermostats, said connections, insulated disks and head being also contained in said outer isolated section, and a liquid heating element contained in all of said radiator sections except said isolated section, said thermostats being subjected to and controlled by variations in temperature of said liquid heating element.

26. In an electric radiator, a plurality of hollow sections adapted to receive a liquid heating element, coupling devices for the upper and lower portions of said sections, the lower coupling devices being of greater area than the upper coupling devices, whereby an enlarged chamber is formed at the bottom of said sections, an electric heating unit located in said chamber at the bottom of said sections and comprising a head having a pluraliy of tubes open at their outer ends and closed at their inner ends, insulating linings for each of said tubes, an insulating core contained in each of said linings, a heating coil wound around each of said cores and contained between said linings and cores, an insulating disk placed against the outer surface of said head and having the outer ends of said cores passing therethrough, an outer insulating disk through which the terminals of said coils pass, binding posts on said outer disks, means for isolating the outer radiator section from the other sections, thermostats contained in said outer isolated section, connections from each of said heating coils and binding posts to said thermostats, said connections, insulated disks and head being also contained in said outer isolated section, and liquid heating elements contained in said radiator sections except said isolated section, said elements comprising a liquid and clay marbles contained in said liquid, said thermostats being subjected to and controlled by the variations in temperature of said heating elements.

27. In an electric radiator, a plurality of sections coupled together and provided with an enlarged chamber at the bottom, an electric heating element positioned in said chamber and comprising a head having tubes open at one end and closed at the other ends secured therein, an insulating lining for each of said tubes, an insulating core for each of said tubes, a heating coil mounted on each of said cores, an inner insulating disk in proximity to the outer portion of said head through which the outer ends of said cores pass, an outer insulating disk abutting the outer ends of said cores and provided with binding posts, said coils being connected to said binding posts, an outer radiator section isolated from the other radiator sections and provided with thermostats, connections from said binding posts to said thermostats, an air tube open at one end and closed at the other and having its open end in proximity to said thermostats, said air tube and head having threaded portions serving as couplings for the two outer radiator sections, and a liquid heating element located in all of said sections except the outer isolated section.

28. In an electric radiator, a plurality of sections coupled together and provided with an enlarged chamber at the bottom, an electric heating element positioned in said chamber and comprising a head having tubes open at one end and closed at the other ends secured therein, an insulating lining for each of said tubes, an insulating core for each of said tubes, a heating coil mounted on each of said cores, an inner insulating disk in proximity to the outer portion of said head through which the outer ends of said cores pass, an outer insulating disk abutting against the outer ends of said cores and provided with binding posts, said coils being connected to said binding posts, an outer radiator section isolated from the other radiator sections and provided with thermostats, connections from said binding posts to said thermostats, an air tube open at one end and closed at the other and having its open end in proximity to said thermostats, said air tube and head having threaded portions serving as couplings for the two outer radiator sections, and heating elements in all of said sections except the outer isolated section composed of a liquid and clay marbles in said liquid for creating latent heat.

29. In an electric radiator, a plurality of radiator sections coupled together and provided with an enlarged chamber at the bottom, an electric heating element in said bottom chamber and comprising a head having tubes therein open at one end and closed at their other ends, an insulating lining for each of said tubes, an insulating core for each of said tubes, a heating coil on each of said cores, an inner insulating disk in proximity to the outer portion of said head through which the outer ends of said cores pass, a second outer insulating disk abutting against the outer ends of said cores and provided with binding posts, said coils being connected to said binding posts, an outer radiator section isolated from the other radiator sections and provided with thermostats, connections from said binding posts contained in said isolated section and leading to said thermostats, an air tube open at one end and closed at the other and having its open end in proximity to said thermostats, the outer end of said air tube serving as a coupling for the two outer radiator sections, a liquid heating element contained in all of said sections except the outer isolated section, and clay marbles contained within said radiator sections and surrounded by said liquid heating element.

30. In an electric radiator, a plurality of radiator sections coupled together and provided with an enlarged chamber at the bottom, an electric heating element in said bottom chamber and comprising a head having tubes therein open at one end and closed at the other ends, an insulating lining for each of said tubes, an insulating core for each of said tubes, a heating coil on each of said cores, an inner insulating disk in proximity to the outer portion of said head through which the outer ends of said cores pass, a second outer insulating disk abutting against the outer ends of said cores and provided with binding posts, said coils being connected to said binding posts, an outer radiator section isolated from the other radiator sections and provided with thermostats, connections from said binding posts contained in said isolated section and leading to said thermostats, an air tube open at one end and closed at the other and having its open end in proximity to said thermostats, the outer end of said air tube serving as a coupling for the two outer radiator sections, a liquid heating element contained in all of said sections except the outer isolated section, and clay marbles contained within said radiator sections and surrounded by said liquid heating element, in combination with a bottom removable plate giving access to said disks and binding posts, and an upper removable case giving access to said thermostats.

31. An electric radiator composed of a plurality of sections coupled together, said sections having an enlarged chamber formed at the lower portion thereof, an electric heating unit positioned in said chamber and comprising a head, and tubes provided with closed ends projecting from said head into said chamber, heating coils contained within said tubes and insulated therefrom, means for isolating an outer section of said radiator from the other sections, thermostats contained in said isolated section, a liquid heating element in all of said sections except said isolated section, connections from each of said heating coils to said thermostats, a closure at the upper portion of said outer section for giving access to said thermostats, a closure at the lower portion of said section for giving access to said head and heating coils, and an air tube closed at one end and open at the other located in the upper portion of said radiator sections.

EDMUND B. LENNIG.

Witnesses:
F. J. MEINCKE,
RUSSELL L. THOMSON.